(12) United States Patent
Bravin et al.

(10) Patent No.: US 7,333,507 B2
(45) Date of Patent: Feb. 19, 2008

(54) MULTI MODAL COMMUNICATIONS SYSTEM

(76) Inventors: Philip Bravin, 102 N. Krohn Pl., Sioux Falls, SD (US) 57103; Ben Soukup, 102 N. Krohn Pl., Sioux Falls, SD (US) 57103; Randy Gerloff, 102 N. Krohn Pl., Sioux Falls, SD (US) 57103

( * ) Notice: Subject to any disclaimer, the term of this patent is extended or adjusted under 35 U.S.C. 154(b) by 1128 days.

(21) Appl. No.: 10/230,757

(22) Filed: Aug. 29, 2002

(65) Prior Publication Data
US 2003/0069997 A1 Apr. 10, 2003

Related U.S. Application Data

(60) Provisional application No. 60/316,033, filed on Aug. 31, 2001.

(51) Int. Cl.
*H04J 3/16* (2006.01)
(52) U.S. Cl. .................... 370/466; 370/352; 704/1
(58) Field of Classification Search ............... None
See application file for complete search history.

(56) References Cited

U.S. PATENT DOCUMENTS

| | | | |
|---|---|---|---|
| 6,163,531 A | * | 12/2000 | Kumar ................... 370/260 |
| 6,198,751 B1 | * | 3/2001 | Dorsey et al. ........... 370/466 |
| 6,202,084 B1 | * | 3/2001 | Kumar et al. ........... 709/204 |
| 6,373,817 B1 | * | 4/2002 | Kung et al. .............. 370/217 |
| 6,385,193 B1 | * | 5/2002 | Civanlar et al. ........ 370/352 |
| 6,438,217 B1 | * | 8/2002 | Huna ..................... 379/88.14 |
| 6,490,275 B1 | * | 12/2002 | Sengodan ................ 370/356 |
| 6,775,296 B1 | * | 8/2004 | Kitamura ................ 370/466 |
| 7,035,383 B2 | * | 4/2006 | O'Neal ................. 379/88.13 |
| 7,120,139 B1 | * | 10/2006 | Kung et al. ............. 370/352 |
| 7,130,792 B2 | * | 10/2006 | Tokieda et al. ............. 704/7 |
| 2001/0033580 A1 | * | 10/2001 | Dorsey et al. ........... 370/466 |

FOREIGN PATENT DOCUMENTS

WO  WO 98/19438  * 5/1998

* cited by examiner

*Primary Examiner*—Bob A. Phunkulh
(74) *Attorney, Agent, or Firm*—Mark A. Ekse (57) ABSTRACT

A multi modal communications system for facilitating interpersonal conversational communications and messaging communications over a network structure. The multi modal communications system includes a portal system for transmitting and receiving communications between various communications modes, a first communications channel providing connectivity between a first user and the portal system, and a second communications channel providing connectivity between a second user and the portal system whereby the first user communicates with the second user through the portal system.

48 Claims, 6 Drawing Sheets

| Personal Communications Preferences 70 | |
|---|---|
| Spoken Speech Table 71 | |
| Visual Speech Table 72 | |
| Speech Font 73 | Gender |
| | Age Group |
| | Nationality |
| | Locality |
| | Tone |
| Avatar Font 74 | Gender |
| | Age Group |
| | Ethnic Group |
| | General Appearance |
| User Name | |
| Password | |
| Communications Mode | |
| Communications Means | |
| Message Communications Mode | |
| Message Communications Means | |

Fig. 6

MULTI MODAL COMMUNICATIONS SYSTEM

CROSS REFERENCE TO RELATED APPLICATION

This application claims the benefit of U.S. Provisional Application No. 60/316,033, filed Aug. 31, 2001.

BACKGROUND OF THE INVENTION

1. Field of the Invention

The present invention generally relates to the processing of telecommunications between parties in particular, to a multi modal (multi protocol, multi platform) portal for communications.

2. Background of the Invention

There are two basic ways that communication takes place. One way would be direct communication in which people communicate with one another directly, using the same language and mode (i.e. English via voice as we all do in the United States). Another way of direct communication uses text and in English, like instant messaging. Due to advanced technology, our communication and related behavioral modes allow for forms of communication that do not necessarily call for direct, but indirect communication. Indirect communication allows the speaker (communicator) and the recipient (communicates) to use whatever mode and language suits the individual. Using a deaf person as an example, the advent of relay services in the United States and some parts of the world today allow deaf and hard of hearing people to communicate over the phone. Telecommunications relay services ("TRS") or Dual Party Relay Services ("DPRS") enable deaf, hard of hearing, speech impaired individuals to employ text telephones for engaging in a communication session over a telephone network with a person who has a conventional voice telephone. Deaf, hard of hearing, speech impaired individuals utilize Text Telephones, such as Telecommunication Devices for the Deaf (TDD), to communicate over the telephone with hearing and speaking parties using conventional telephones. The deaf person typically uses a keyboard on the TDD or TTY, a specially equipped device with a keyboard, to communicate with a relay operator who voices what the deaf person types to the hearing person on the other end over the telephone. A typical TDD has an alphanumeric keyboard and either a full screen or a single line character display and uses BAUDOT or ASCII signaling or both. The phone is the common denominator here. In this situation, the deaf person uses a keyboard to express himself and a display device to understand what is being said by the other party. The hearing person hears what is being said and uses his voice to express himself. The heart of this system is the interface, or protocol converter. The relay operator acts as the interface in this situation. The relay operator actually relays information from one communication protocol to another.

BRIEF SUMMARY OF THE INVENTION

In view of the foregoing the present invention is directed to a system and method of providing a multi protocol, multi platform portal for communications between parties on a telecommunications network.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the inventions wherein.

FUNCTIONAL DESCRIPTION OF THE INVENTION

Figure 1:
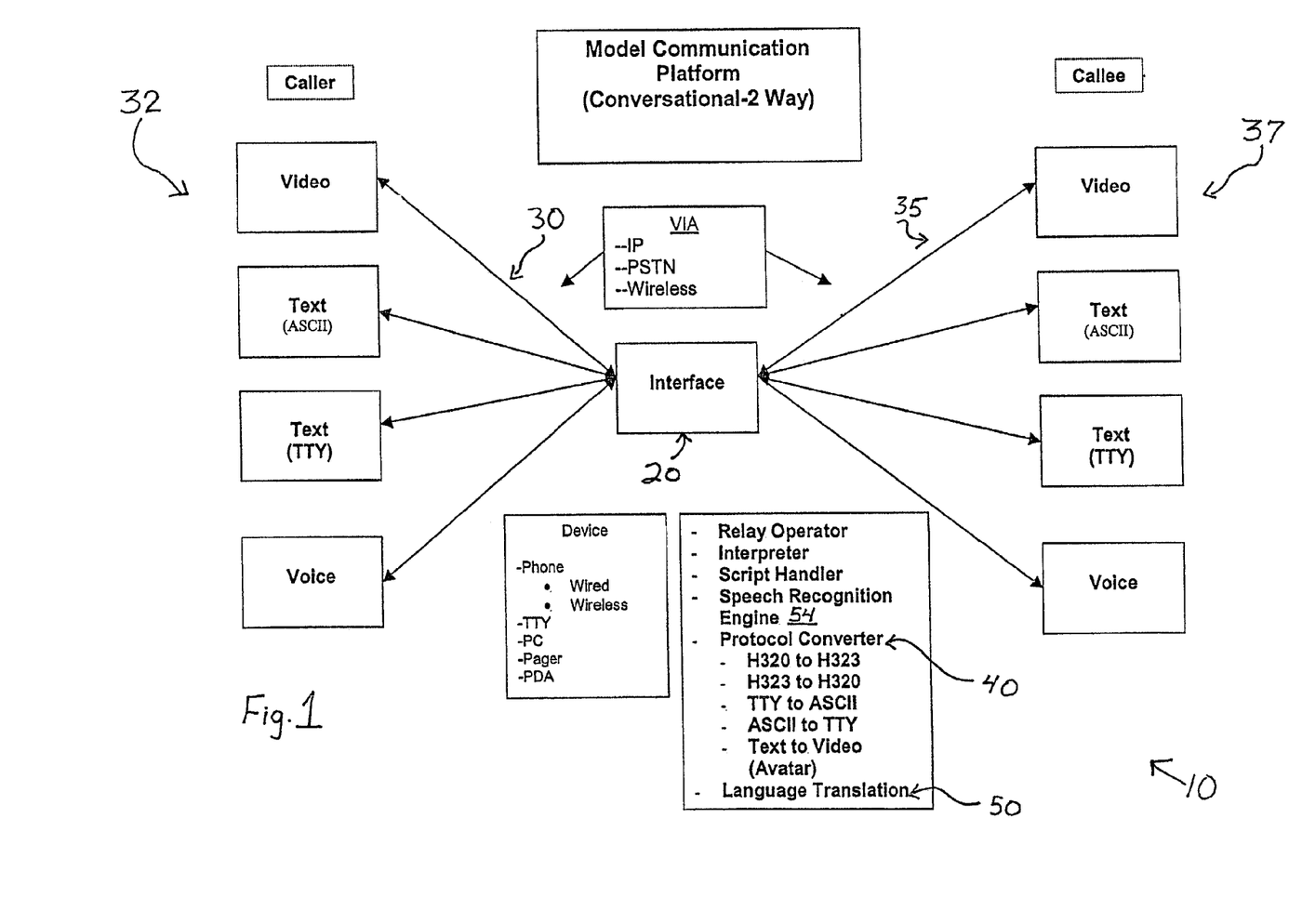
FIG. 1. is a schematic block diagram of a communications protocol system for duplex communications transactions.
Figure 2:
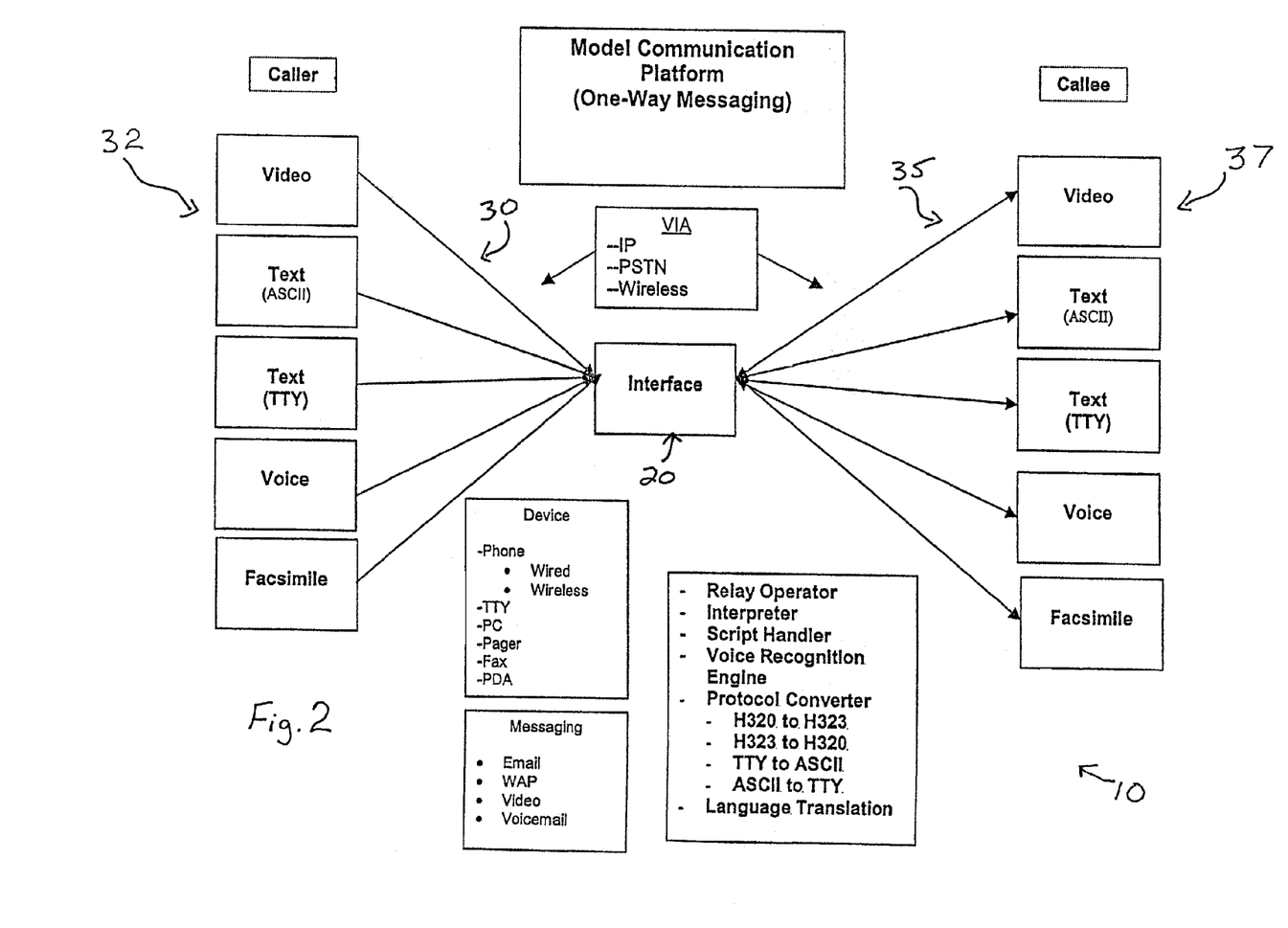
FIG. 2 is a schematic block diagram of a communications protocol system for simplex communications transactions.

FIGS. 1-2 illustrate, from a user transmission and reception point of reference, a multi-modal (multi-protocol, multi-platform) portal for communications between a caller and callee on a telecommunications network, such as the World-Wide-Web. The multi-protocol, multi-platform portal for communications can be placed on the web as a communication portal. The portal, then also serve as a messaging center for everyone to leave messages in any form of shape, video, text, facsimile and transmitted by leaving in a mailbox or sent to a pager. In operation, the communicator or subscriber would sign on with his name and password. The platform having the communicator's profile, would then know his preferences, communication modes and other desired parameters. He could then indicate the recipient's name, phone number, or IP address and indicate the mode of communication, or the language desired or the protocol desired at the time of sign-on.

Referring to FIGS. 1 and 2, there are several modes of the communications disclosed including but not limited to a video mode, text (ASCII) mode, text mode with TTY/TDD, and a video mode. The transmission mediums for the modes includes many types of telecommunications systems and networks environments. For example, a local, national, international telecommunications Public Switched Telephone Network (PSTN) network, Internet, a CATV network providing telephony, a wireless/satellite telecommunications network, including cellular, or Personal Communication Services (PCS) networks or other suitable networks. Devices for accomplishing the modes of communications includes telephones, TTY/TDD, personal computers, pagers, or personal digital assistants.

In a 2-way communication mode, or "conversational" mode in this case, referring to FIG. 1, in one example of the portal in the text mode (ASCII or TTY)-to-voice, a deaf person would sign onto the system, indicate the phone number of the hearing person, and maybe his name. The system automatically dials the phone number and bring up the trained voice recognition profile for that person (assuming the hearing person's number was pre-stored in the portal) and then communication takes place automatically. In this case, the portal includes text-to-speech and speechto-text hardware and software as known to one ordinary skill in the art. The voice recognition engine then would take over and continually train itself to understand the speaker (hearing person). In doing so, it becomes a very enhanced speaker dependent profile and becomes more accurate over time.

Referring to FIG. 1, we can replace a human relay operator with one that is totally automated/electronic, and use artificial intelligence equipment and technology. The deaf person keys his message in the usual manner to a TRS, the protocol converter in this case could be a speech synthesizer which voices what the deaf person typed for the hearing person to hear. Likewise, the hearing person talks back in to a voice recognition engine which then translates it into text for the deaf person to understand. The voice synthesizer could be further enhanced to match the deaf persons physical characteristics, 40 year old male, with a southern Texas accent to properly reflect his identity and background and also to create a sense of virtual identity.

Instead of using a text, we can use a video mode. In this case, the relay operator, or protocol converter is a sign language interpreter. The deaf person, instead of typing, uses sign language to communicate using a computer or a dedicated video device to the interpreter who uses a similar device. The interpreter then relays the message in the usual manner using voice over a phone line or Internet to the hearing person. The hearing person then voices back to the deaf person through the interpreter who signs to the deaf person what he hears the hearing person speak. Various enhancements can be made to the system.

As the shown in FIG. 1, the protocol converter or interface is not necessarily limited to the pure form of text or video or voice for that matter. It could handle voice on both ends, but then could function as an automated language translator converting voice from one language to anther. In this case, the language refers to linguistic spoken languages. For example, a hearing person can also speak in English to the protocol converter and the protocol converter would then synthesize his voice in French to a colleague in France. This has application to a video relay system or TRS environment. Likewise for video modes, the protocol converter can convert from H320 (ISDN) to H323 (IP) protocols and vice versa. Also, from text (ASCII) to text (TTY-Baudot).

Another example of the communication portal, a hearing person can to speak into the protocol converter, which could create a sign language avatar for expressing what the hearing person speaks into corresponding sign language. Conversely, a sign language recognition engine can convert sign language into voice or text for that matter. This has application for a deaf blind person who cannot hear voice, and can communicate with a deaf person who signs and when converted can go into an ASCII soft brailler for the deaf blind person to understand sign language on the other end. Furthermore, this has application to a video relay system or TRS environment.

The devices to accomplish all of this is based on an intelligent processor with software, in this case would be a personal computer. The PC would always be located at the point of the protocol converter and sometimes at the caller or the callee's site but not necessarily at all times. The PC may be a general-purpose computer, such as a mini-computer, a high-speed computer workstation, or a laptop computer configured accordingly.

Hardware components of the computer system include a central processing unit, a system memory, and a system bus that couples various computer system components. Central processing unit may be one or more suitable general-purpose microprocessors used in a conventional computer. A storage device and associated computer-readable media provide nonvolatile storage of computer readable code and instructions for execution on the computer system. If desired, a user may enter commands and information into computer system through an input device such as a keyboard. In addition, a monitor can be used for display. The computer system can include other peripheral output devices, such as a laser printer. Such computer systems are known to one of ordinary skill in the art. If desired, computer system may operate in a networked environment using a network connection to one or more a destination clients such as a computer workstation or a network server. The networked environment may include a local area network (LAN), a wide area network (WAN), or a distributed network, such as the Internet including the World Wide Web. Instead of the PC, the device used may range from a simple telephone, to a PDA (personal digital assistant).

All of this so far emphasizes a 2-way communication mode, or "conversational" mode in this case. As shown in FIG. 2, shifting to a 1-way communication mode, which could be termed a "messaging" mode. Most of the same applications could be used in this context with a protocol converter like the 2-way mode, but extend its functionality to email, Video email, text email, voice email, facsimile email could be run through a protocol converter and then converted to a form that the recipient would like. The recipient could also have pre-selected profiles on the protocol. The recipient could receive messages in any form and determine which form he would like to read the message in . . . video, text or voice. For example, a sender could send a message in voice, have it run through a protocol converter which recognizes voice and creates a text message, or a sign language avatar for the deaf person to see. One example of a web portal is shown in U.S. Pat. No. 6,038,668 to Chipman which is herein expressly fully incorporated by reference for all purposes.

In should be recognized that the web portal can include computerized gateway processors, which converts to the various protocols as disclosed. The web portal provides integration for the users. In addition, many modifications may be made to adapt a particular situation or material to the teachings of the invention without departing from the scope thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

As best illustrated in FIGS. 1 through 6, the multi modal communications system 10 generally comprises a portal system 20, a first communications mode 30, a second communications mode 35, a mode translator 40, and a language translator 50.

Figure 3:
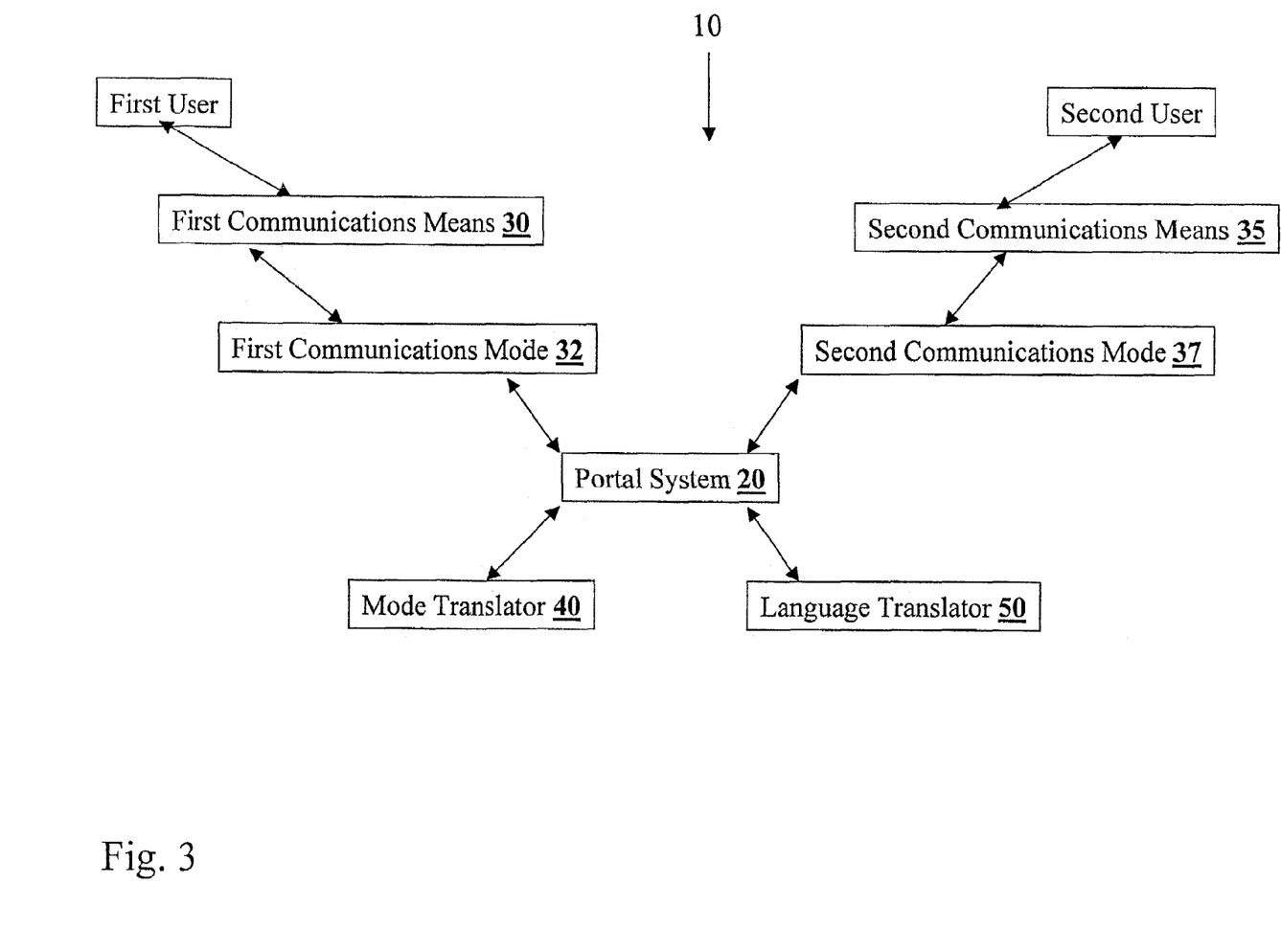
FIG. 3 is a schematic block diagram of system connectivity of the present invention.

The portal system 20 provides high level system control and routing. The first communications mode 30 provides connectivity between a first user and the portal system 20. Similarly, the second communications mode 35 provides connectivity between a second user and the portal system 20 whereby the first user communications with the second user through the portal system 20.

Each of the first 30 and second communications modes 35 are independently selectable from the group of communications modes consisting of Public Switched Telephone Network, CATV with telephony, wireless telecommunications network, satellite communications network, PCS, GSM, Internet, World Wide Web, SONET, and Integrated Services Digital Network (ISDN).

The portal system 20 in conjunction with the mode translator 40 and the language translator 50 serves as a switching network and translator between the first 30 and second communication modes 35. The first communications mode 30 is associated with a communications means 32 selected from the group of communications means consisting of voice only, voice and video, video, text, or ASCII soft Braille. Similarly, the second communications mode 35 is associated with a communications means 37 selected from the group of communications means consisting of voice only, voice and video, video, text, or ASCII soft Braille.

The mode translator 40 operationally interacts with the portal system 20. The mode translator 40 facilitates translation between the first communication mode 30 and the second communication mode 35. Typically, the first user uses a first language to communicate with the portal system 20, and the second user uses a second language to communicate with the portal system 20. In some instances the first language and the second language may be the same. The messaging functions of this system 10 are just one example of a case in which the first and second languages may be the same.

The language translator 50 operationally interacts with the portal system 20 to translate between the first language and message data. The language translator 50 also operationally interacts with the portal system 20 to translate between the second language and message data.

Figure 4:
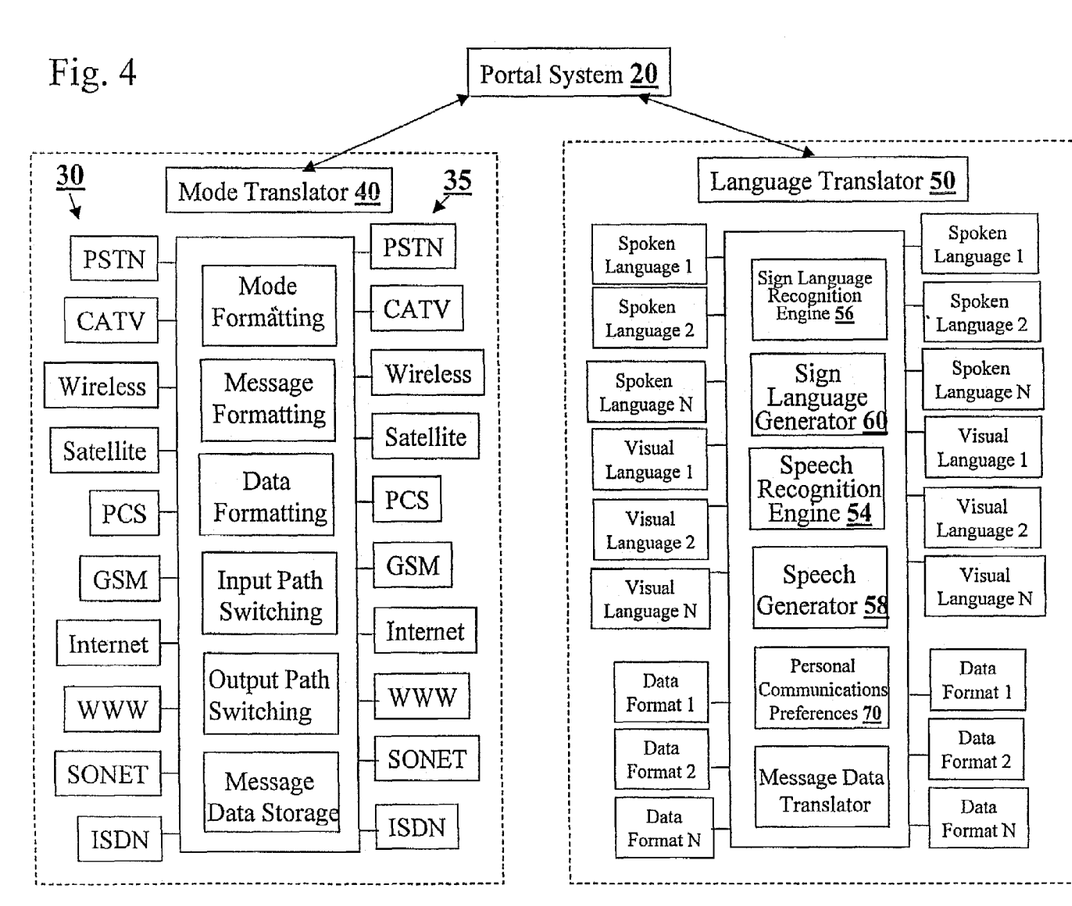
FIG. 4 is a schematic block diagram of and embodiment of the portal system, mode translator, and language translator of the present invention.

In a preferred embodiment, the language translator 50 further comprises a human interpreter 52. The portal system 20 includes an interpreter interface 22 to facilitate interaction between the human interpreter 52 and the portal system 20. The human interpreter 52 may translate between a first spoken language and a second spoken language, a spoken language and a visual language, a first visual language and a second visual language, a spoken language and a data format, or a visual language and a data format.

Figure 5:
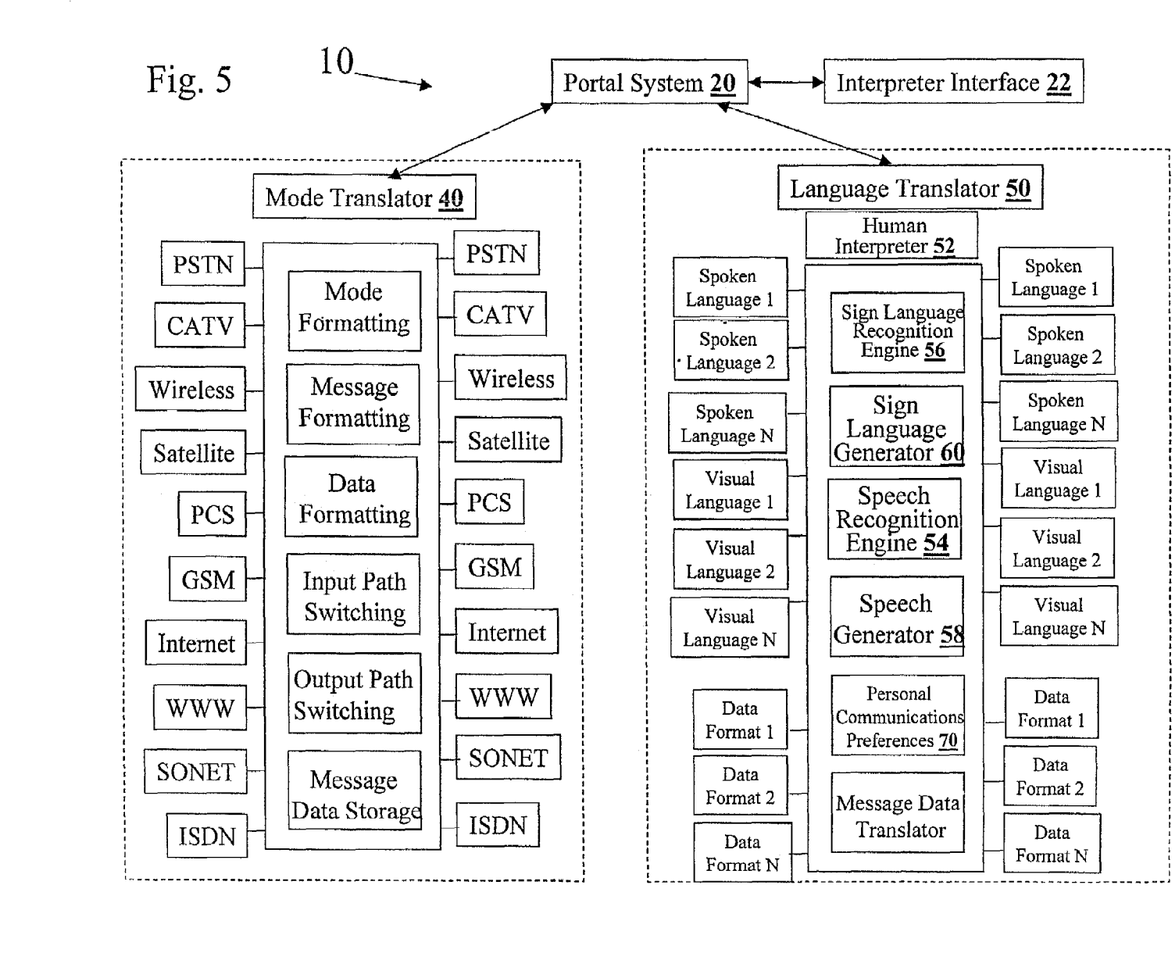
FIG. 5 is a schematic block diagram of a further embodiment of the portal system, mode translator and language translator of the present invention.

In a further embodiment the language translator 50 further comprises a speech recognition engine 54, a sign language recognition engine 56, a speech generator 58, a sign language generator 60, and a set of personal communications preferences 70.

The speech recognition engine 54 may be operationally coupled to the portal system 20. The speech recognition engine 54 is used to facilitate translation between a spoken language and a visual language, a spoken language and a data format, a first spoken language and a second spoken language. The speech recognition engine 54 may supplement or replace the hearing function of a human interpreter 52. The personal communication preference 70 includes a spoken speech table 71 such that the speech recognition engine 54 is trainable for a specific user.

The sign language recognition engine 56 may be operationally coupled to the portal system 20. The sign language recognition engine 56 facilitates translation between a visual language and a spoken language, a visual language and a data format, or a first visual language and a second visual language. The sign language recognition engine 56 may supplement or replace the visual functions of the human interpreter 52. The personal communication preference 70 further includes a visual speech table 72 such that the sign language recognition engine 56 is trainable for a specific user.

The speech generator 58 may also be operationally coupled to the portal system 20. The speech generator 58 facilitates translation between a first spoken language and a second spoken language, a spoken language and a visual language, or a spoken language and a data format. The personal communications preference 70 further includes a speech font 73 such that vocal qualities of the speech generator are modifiable by the user. The speech generator 58 may be used to augment or replace the vocal capabilities of a human interpreter 52.

Figure 6:
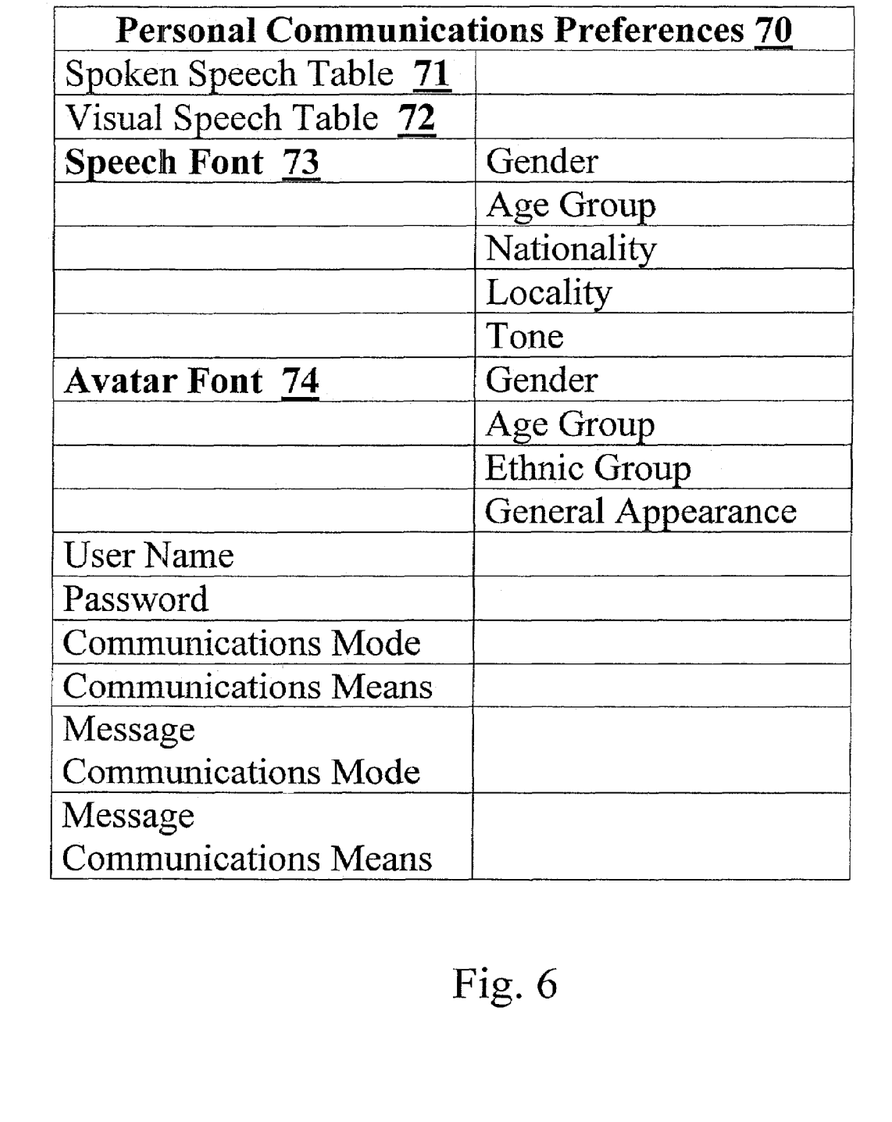
FIG. 6 is a block diagram of the personal communications preferences of the present invention.

In still a further embodiment the speech font 73 includes parameters for specifying gender, age group, nationality, locality, and tone.

The sign language generator 60 may be operationally coupled to the portal system 20. The sign language generator 60 facilitates translation between a first visual language and a second visual language, a visual language and a spoken language, or a visual language and a data format.

In yet a further embodiment the sign language generator 60 presents an avatar includes a torso, arms, hands, and a head. The avatar provides a visual representation of a visual language. The personal communications preference 70 may further include an avatar font 74 such that visual qualities of the sign language generator 60 are modifiable by the user. The avatar font 74 may include parameters for specifying gender, age group, ethnicity, and general appearance. Factors for general appearance may include, but are not necessarily limited to: hair color, hair length, skin tone, eye color, eye shape, mouth shape, and nose shape.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A multi-modal network system for interpersonal communications comprising:
   a portal system for transmitting and receiving communications between various communications modes;
   a first communications channel providing connectivity between a first user and said portal system, said first communications channel being selected from the group of communications modes consisting of Public Switched Telephone Network, CATV with telephony, wireless telecommunications network, satellite communications network, PCS, GSM, Internet, World Wide Web, SONET, H320 video-conferencing (ISDN), and H323 video-conferencing (IP);
   a second communications channel providing connectivity between a second user and said portal system whereby said first user communications with said second user through said portal system, said second communications channel being selected from the group of communications modes consisting of Public Switched Telephone Network, CATV with telephony, wireless telecommunications network, satellite communications network, PCS, GSM, Internet, World Wide Web, SONET, H320 video-conferencing (ISDN), and H323 video-conferencing (IP); said first communications channel being selected independently from selection of said second communications channel;

a data handling subsystem for identifying a first communication means being utilized over said first communications channel and a second communication means being utilized over said second communications channel; said first and second communications means being selectable from a group of communications means consisting of voice, facsimile, data, ASCII text, TTY-baudot, video or ASCII soft brail, said first communication means being selected independently from selection of said second communications means; said first communications means being selectable to accommodate personal communications preferences of the first user, said second communications means being selectable to accommodate personal communications preferences of the second user.

2. The system of claim 1, further comprising a speech recognition engine operationally coupled to said portal system, said speech recognition engine facilitating translation of spoken speech into message data, said message data being routable via said portal system through a selected combination of communications channel, communications mode, and communications means.

3. The system of claim 2, wherein said personal communications preferences further includes a spoken speech table such that said speech recognition engine being trainable for specific users based upon said spoke speech table.

4. The system of claim 1, further comprising a spoken language translator for converting a first spoken language to a second spoken language such that said first and second users do not need to use that same spoken language.

5. The system of claim 1, further comprising: a messaging subsystem for routing message data from a first user to second user in a delayed mode, said messaging subsystem being operationally coupled to said portal system for receiving said message data; a messaging profile for pre-selecting a method of delivery for a delayed message.

6. The system of claim 5 wherein said method of delivery being selected from a group of delivery methods consisting of voice mail, electronic mail, electronic paging, web-site access, and facsimile.

7. The system of claim 1, further comprising a visual language translator for converting a first visual language to a second visual language such that said first and second users do not need to use the same visual language.

8. The system of claim 1, further comprising a human interpreter for converting a spoken language to message data and converting message data to a spoken language; a human interpreter interface operationally coupled to said portal system, said human interpreter interface having a data input means and a data output means facilitating interaction between said human interpreter and said portal system.

9. A multi-modal network system for interpersonal communications comprising:

a portal system for transmitting and receiving communications between various communications modes;

a first communications channel providing connectivity between a first user and said portal system, said first communications channel being selected from the group of communications modes consisting of Public Switched Telephone Network, CATV with telephony, wireless telecommunications network, satellite communications network, PCS, GSM, Internet, World Wide Web, SONET H320 video-conferencing (ISDN), and H323 video-conferencing (IP);

a second communications channel providing connectivity between a second user and said portal system whereby said first user communications with said second user through said portal system, said second communications channel being selected from the group of communications modes consisting of Public Switched Telephone Network, CATV with telephony, wireless telecommunications network, satellite communications network, PCS, GSM, Internet, World Wide Web, SONET, H320 video-conferencing (ISDN), and H323 video-conferencing (IP); said first communications channel being selected independently from selection of said second communications channel;

a data handling subsystem for identifying a first communication means being utilized over, said first communications channel and a second communications means being utilized over said second communications channel; said first and second communications means being selectable from a group of communications means consisting of voice, facsimile, data, ASCII text, TTY-baudot, video or ASCII soft brail, said first communications means being selected independently from selection of said second communications means; said first communications means being selectable to accommodate personal communications preferences of the first user; said second communications means being selectable to accommodate personal communications preferences of the second user; and a speech generation engine such that message data may be converted to a spoken language, said spoken language being routable via a selected combination of communications channel, communications mode, and communications means.

10. The system of claim 9, wherein said personal communications preferences further includes a generated speech table such that said spoken language being modifiable based on said generated speech table.

11. The system of claim 10, wherein said generated speech table further includes a gender selection such that the vocal qualities of said spoken language reflect the gender of the user.

12. The system of claim 10, wherein said generated speech table further includes an age group selection such that the vocal qualities of said spoken language reflect the age of the user.

13. The system of claim 10, wherein said generated speech table further comprises a nationality selection such that the vocal qualities of said spoken language reflect the nationality of the user.

14. The system of claim 10, wherein said generated speech table further includes a geographic region selection such that the vocal qualities of said spoken language reflect a geographic region selected by the user.

15. The system of claim 10, wherein said generated speech table further includes a tone selection such that the vocal qualities of said spoken language are modifiable to a tone selected by the user.

16. The system of claim 10, wherein said generated speech table further comprises: a gender selection such that the vocal qualities of said spoken language reflect the gender of the user; an age group selection such that the vocal qualities of said spoken language reflect the age of the user; a nationality selection such that the vocal qualities of said spoken language reflect the nationality of the user, a geographic region selection such that the vocal qualities of said spoken language reflect a geographic region selected by the user, a tone selection such that the vocal qualities of said spoken language are modifiable to a tone selected by the user.

17. The system of claim 9, further comprising a sign language interpreter for reading sign language and translating said sign language to message data using a message format, said sign language interpreter being supplied with a video signal via said portal system.

18. The system of claim 17, wherein said sign language interpreter being a human being, said portal system routing a visual representation of a video signal from a user, said human being providing real time translation of sign language into a message format.

19. The system of claim 17 wherein said sign language interpreter being a sign language recognition engine, said sign language recognition engine converting a visual representation of sign language into message data, said sign language recognition engine being operationally coupled to said portal system.

20. The system of claim 17, further comprising a personal communications preferences including a visual speech table such that said sign language recognition engine being trainable for specific users.

21. A multi-modal network system for interpersonal communications comprising;
a portal system for transmitting and receiving communications between various communications modes;
a first communications channel providing connectivity between a list user and said portal system, said first communications channel being selected from the group of communications modes consisting of Public Switched Telephone Network, CATV with telephony, wireless telecommunications network, satellite communications network, PCS, GSM, Internet, World Wide Web, SONET, H320 video-conferencing (1ISDN), and H323 video-conferencing (IP);
a second communications channel providing connectivity between a second user and said portal system whereby said first user communications with said second user through said portal system, said second communications channel being selected from the group of communications modes consisting of Public Switched Telephone Network, CATV with telephony, wireless telecommunications network, satellite communications network, PCS, GSM, Internet, World Wide Web, SONET, H320 video-conferencing (ISDN), and H323 video-conferencing (IP); said first communications channel being selected independently from selection of said second communications channel;
a data handling subsystem for identifying a first communication means being utilized over said first communications channel and a second communication means being utilized over said second communications channel; said first and second communications means being selectable from a group of communications means consisting of voice, facsimile, data, ASCII text, TTY-baudot, video or ASCII soft brail, said first communication means being selected independently from selection of said second communication means, said first communications means being selectable to accommodate a personal communications preferences of the first user, said second communications means being selectable to accommodate communications preferences of the second user; and a sign language generator for converting message data to sign language, said portal system providing said message data to said sign language generator.

22. The system of claim 21, wherein said sign language generator being a human being, said portal system routing a message data to said human being providing real time translation of said message data into sign language.

23. The system of claim 21, wherein said sign language generator being an avatar, said avatar providing an automated visual representation of sign language, said avatar being operationally coupled to said portal system such that said message data provides and input for said avatar.

24. The system of claim 23 further comprising a personal communications preference including a visual speech generation table such that a form of said avatar is modifiable in accordance with preferences of the user.

25. The system of claim 24, wherein said visual speech generation table further comprises a gender selection such that the visual qualities of the avatar correspond with the gender of the user.

26. The system of claim 24, wherein said visual speech generation table further comprises an age selection such that the visual qualities of the avatar correspond with the age of the user.

27. The system of claim 24, wherein said visual speech generation table further comprises a ethnic background selection such that the visual qualities of the avatar correspond with the ethnic background of the user.

28. The system of claim 24, wherein said visual speech generation table further comprises a general appearance selection such that the visual qualities of the avatar correspond with a general appearance selected by the user.

29. A multi-modal network system for interpersonal communications comprising;
a portal system for transmitting and receiving communications between various communications modes;
a first communications channel providing connectivity between a first time user and said portal system said first communications channel being selected from the group of communications modes consisting of Public Switched Telephone Network, CATV with telephony, wireless telecommunications network, satellite communications network, PCS, GSM, Internet, World Wide Web, SONET H320 video-conferencing (ISDN), and H323 video-conferencing (IP);
a second communications channel providing connectivity between a second user and said portal system whereby said first user communications with said second uses through said portal system, said second communications channel being selected from the group of communications modes consisting of Public Switched Telephone Network,. CATV, with telephony, wireless telecommunications network, satellite communications network, PCS, GSM, Internet, World Wide Web, SONET, H320 video-conferencing (ISDN), and H323 video-conferencing (IP); said first video-conferencing channel being selected independently from selection of said second communications channel;
a data handling subsystem for identifying a first communications means being utilized over said first communications channel and a second communication means being utilized over said second communications channel; said first and second communications means being selectable from a group of communications means consisting of voice facsimile, data, ASCII text, TTY-baudot, video or ASCII soft brail said first communication means being selected independently from selection of said second communication means; said that communications means being selectable to accommodate personal communications preferences of the first user, said second communications means being selectable to accommodate personal communications preferences of the second user and;

a speech recognition engine operationally coupled to said portal system, said speech recognition engine facilitating translation of spoken speech into message data, said message data being routable via said portal system through a selected combination of communications channel, communications mode, and communications means, said personal communications preferences further includes a spoken speech table such that said speech recognition engine being trainable for specific users based upon said spoke speech table; a speech generation engine such that message data may be converted to a spoken language, said spoken language being routable via a selected combination of communications channel, communications mode, and communications means; said personal communications preferences further includes a generated speech table such that said spoken language being modifiable based on said generated speech table; wherein said generated speech table further comprises a gender selection such that the vocal qualities of said spoken language reflect the gender of the user; an age group selection such that the vocal qualities of said spoken language reflect the age of the user; a nationality selection such that the vocal qualities of said spoken language reflect the nationality of the user; a geographic region selection such that the vocal qualities of said spoken language reflect a geographic region selected by the user, a tone selection such that the vocal qualities of said spoken language are modifiable to a tone selected by the user, and a sign language interpreter for reading sign language and translating said sign language to message data using a message format, said sign language interpreter being supplied with a video signal via said portal system.

30. The system of claim 29, wherein said sign language interpreter being a human being, said portal system routing a visual representation of a video signal from a user, said human being providing real time translation of sign language into a message format.

31. The system of claim 29, wherein said sign language interpreter being a sign language recognition engine, said sign language recognition engine converting a visual representation of sign language into message data, said sign language recognition engine being operationally coupled to said portal system; said personal communications preferences including a visual speech table such that said sign language recognition engine being trainable for specific users; and a sign language generator for converting message data to sign language, said portal system providing said message data to said sign language generator.

32. The system claim 31, wherein said sign language generator being a human being said portal system routing a message data to said human being providing real time translation of said message data into sign language.

33. The system of claim 31, wherein said sign language generator being an avatar, said avatar providing an automated visual representation of sign language, said avatar being operationally coupled to said portal system such that said message data provides and input for said avatar, said personal communications preference including a visual speech generation table such that a form of said avatar is modifiable in accordance with preferences of the user, wherein said visual speech generation table further comprises: a gender selection such that the visual qualities of the avatar correspond with the gender of the user; an age selection such that the visual qualities of the avatar correspond with the age of the user; an ethnic background selection such that the visual qualities of the avatar correspond with the ethnic background of the user; and a general appearance selection such that the visual qualities of the avatar correspond with a general appearance selected by the user.

34. A multi-modal communications system for facilitating multiple translations comprising:
a portal system providing high level system control and routing;
a first communications mode providing connectivity between a first user and said portal system;
a second communications mode providing connectivity between a second user and said portal system whereby said first user communications with said second user through said portal system;
said first and second communications modes being independently selectable from the group of communications modes consisting of Public Switched Telephone Network, CATV with telephony, wireless telecommunications network, satellite communications network, PCS, GSM, Internet, World Wide Web, SONNET, and Integrated Services Digital Network (ISDN);
said portal system serving as a switching network and translator between said first and second communication modes;
said first communications mode being associated with a communications means selected from the group of communications means consisting of voice only, voice and video, video, text, or ASCII soft brail;
said second communications mode being associated with a communications means selected from the group of communications means consisting of voice only, voice and video, video, text, or ASCII soft brail; a mode translator operationally interacting with said portal system, said mode translator facilitating translation between said first communication mode and said second communication mode;
said first user using a first language to communicate with said portal system;
said second user using a second language to communicate with said portal system;
a language translator operationally interacting with said portal system to translate between first language and message data, said language translator operationally interacting with said portal system to translate between said second language and message data.

35. The system of claim 34, wherein said language translator further comprises a human interpreter, said portal system having an interpreter interface to facilitate interaction between said human interpreter and said portal system, said human interpreter translating between a first spoken language and a second spoken language, said human interpreter translating between a spoken language and a visual language, said human interpreter translating between a first visual language and a second visual language, said human interpreter translating between a spoken language and a data format, said human interpreter translating between a visual language and a data format.

36. The system of claim 34, wherein said language translator further comprises a speech recognition engine operationally coupled to said portal system, said speech recognition engine facilitating translation between a spoken language and a visual language, said speech recognition engine facilitating translation between a spoken language and a data format, said speech recognition engine facilitates translation between a first spoken language and a second spoken language.

37. The system of claim 36, further comprising a personal communication preference including a spoken speech table such that said speech recognition engine is trainable for a specific user.

38. The system of claim 34, wherein said language translator further comprises a sign language recognition engine operationally coupled to said portal system, said sign language recognition engine facilitating translation between a visual language and a spoken language, said sign language recognition engine facilitating translation between a visual language and a data format, said sign language recognition engine facilitating translation between a first visual language and a second visual language.

39. The system of claim 38, further comprising a personal communication preference including a visual speech table such that said sign language recognition engine is trainable for a specific user.

40. The system of claim 34, wherein said language translator further comprises a speech generator operationally coupled to said portal system, said speech generator facilitating translation between a first spoken language and a second spoken language; said speech generator facilitating translation between a spoken language and a visual language, said speech generator facilitating translation between a spoken language and a data format.

41. The system of claim 40, further comprising a personal communications preference including a speech font such that vocal qualities of said speech generator are modifiable by the user.

42. The system of claim 41 wherein said speech font includes parameters for specifying gender, age group, nationality, locality, and tone.

43. The system of claim 34, wherein said language translator further comprises a sign language generator, said sign language generator being operationally coupled to said portal system, said sign language generator facilitating translation between a first visual language and a second visual language said sign language generator facilitating translation between a visual language and a spoken language, said sign language generator facilitating translation between a visual language and a data format.

44. The system of claim 43, where said sign language generator presents an avatar having a torso, arms, hands, and a head, said avatar providing a visual representation of a visual language.

45. The system of claim 44, further comprising a personal communications preference including an avatar font such that visual qualities of said sign language generator are modifiable by the user.

46. The system of claim 45, wherein said avatar font includes parameters for specifying gender, age group, ethnicity, and general appearance.

47. The system of claim 34, wherein said language translator further comprises:

a speech recognition engine operationally coupled to said portal system, said speech recognition engine facilitating translation between a spoken language and a visual language, said speech recognition engine facilitating translation between a spoken language and a data format, said speech recognition engine facilitates translation between a first spoken language and a second spoken language; a personal communication preference including a spoken speech table such that said speech recognition engine is trainable for a specific user, a sign language recognition engine operationally coupled to said portal system, said sign language recognition engine facilitating translation between a visual language and a spoken language, said sign language recognition engine facilitating translation between a visual language and a data format, said sign language recognition engine facilitating translation between a first visual language and a second visual language;

said personal communication preference further includes a visual speech table such that said sign language recognition engine is trainable for a specific user, a speech generator operationally coupled to said portal system, said speech generator facilitating translation between a first spoken language and a second spoken language, said speech generator facilitating translation between a spoken language and a visual language, said speech generator facilitating translation between a spoken language and a data format;

said personal communications preference further includes a speech font such that vocal qualities of said speech generator are modifiable by the user; wherein said speech font includes parameters for specifying gender, age group, nationality, locality, and tone; a sign language generator, said sign language generator being operationally coupled to said portal system, said sign language generator facilitating translation between a first visual language and a second visual language, said sign language generator facilitating translation between a visual language and a spoken language, said sign language generator facilitating translation between a visual language and a data format;

wherein said sign language generator presents an avatar having a torso, arms, hands, and a head, said avatar providing a visual representation of a visual language;

said personal communications preference further includes an avatar font such that visual qualities of said sign language generator are modifiable by the user; and said avatar font includes parameters for specifying gender, age group, ethnicity, and general appearance.

48. The system of claim 47, wherein said portal system further comprises a storage means for storing said message data for delivery to a second user at a later time.

* * * * *